UNITED STATES PATENT OFFICE.

MYRTIL KAHN, OF ELBERFELD, GERMANY, ASSIGNOR TO FARBENFABRIKEN VORM. FRIEDR. BAYER & CO., OF ELBERFELD, GERMANY, A CORPORATION OF GERMANY.

AZO DYE.

936,456.

Specification of Letters Patent. Patented Oct. 12, 1909.

No Drawing. Application filed July 8, 1909. Serial No. 506,563.

*To all whom it may concern:*

Be it known that I, MYRTIL KAHN, doctor of philosophy, chemist, citizen of the German Empire, residing at Elberfeld, Germany, have invented new and useful Improvements in New Azo Dye, of which the following is a specification.

My invention relates to the manufacture and production of new azo dyestuffs.

The process for the production of the new azo dyestuffs consists in combining with one molecule of an 1.8-aminonaphthol sulfonic acid, one molecule of a diazotized para-aminochrysoidin. The latter are obtained by combining acetyl-para-amino-diazo-benzene with meta-phenylenediamin or with meta-toluylene-diamin or with their analogues or homologues and then eliminating the acetyl group from the dye thus prepared. On dyeing or printing the new dyes on cotton and developing them on the fiber with diazotized para-nitranilin fast black shades are obtained.

The new dyestuffs are in the shape of their alkaline salts dark powders soluble in water generally with a violet to bluish color. They yield upon reduction with stannous chlorid and hydrochloric acid a para-diamin of the benzene series, a triamin of the benzene series and an amino-1.8-aminonaphthol sulfonic acid.

In order to illustrate the new process more fully the following example is given, the parts being by weight 22.7 parts of the para-aminochrysoidin (obtainable from acetyl-para-phenylenediamin and meta-phenylenediamin) dissolved in 70 parts of a 20 per cent. hydrochloric acid and 500 parts of water are diazotized with 7 parts of sodium nitrite. The diazocompound thus obtained is then introduced into a neutral solution which has to be well stirred, of 32 parts of 1.8-aminonaphthol-4.6-disulfonic acid. Sodium acetate is added and the stirring is continued for some hours. The product of the reaction is then rendered neutral with sodium carbonate and the dyestuff is filtered off and dried. It is a dark powder soluble in water with a violet color and in concentrated sulfuric acid with a blue color. By reduction with stannous chlorid and hydrochloric acid para-phenylenediamin, 1.2.4-triaminobenzene and 1.2-diamino-8-naphthol-4.6-disulfonic acid are obtained.

A dyebath is prepared from 1000 parts of water, 6 parts of the above described dyestuff, 2 parts of calcined sodium carbonate and 30 parts Glauber salt. 100 parts of cotton are entered, the bath is heated in the course of half an hour to boiling and the boiling is continued for half an hour. The goods which are dyed dark blue are then treated in the usual way with diazotized para-nitranilin, exposed to air and rinsed. A deep black fast to washing is thus obtained which can be discharged to a pure white with hydrosulfites. The cotton can also be padded or printed with these dyestuffs and the black then developed by after-treatment of the goods with diazotized para-nitranilin.

The process for the manufacture of the dyestuffs is carried out in an analogous way on using other 1.8-aminonaphthol sulfonic acids *e. g.* 1.8-aminonaphthol-4-sulfonic acid, -3.5- or -3.6-disulfonic acid etc. or on using other chrysoidins *e. g.* the chrysoidins obtained from meta-toluylenediamin or meta-phenylenediamin sulfonic acid etc.

The dyestuffs thus obtained from these compounds yield similar results on being developed on the fiber with diazotized para-nitranilin to the one described in the example.

I claim:

1. The herein described new azo dyestuffs, obtainable from diazotized para-aminochrysoidins and 1.8-aminonaphthol sulfonic acids, which dyestuffs are, in the shape of their alkaline salts, after being dried and pulverized, dark powders soluble in water generally with a violet to bluish color; yielding upon reduction with stannous chlorid and hydrochloric acid a para-diamin, a tri-amin of the benzene series and an amino-1.8-aminonaphthol sulfonic acid; dyeing cotton generally bluish shades which on being developed with diazotized para-nitranilin are changed to fast black shades, substantially as described.

2. The herein described new azo dyestuff obtainable from diazotized para-aminochrysoidin and 1.8-amino-naphthol-4.6-disulfonic acid, which dyestuff is, after being dried and pulverized, a dark powder soluble in water with a violet color and soluble in concentrated sulfuric acid with a blue color; yielding upon reduction with stannous chlorid and hydrochloric acid paraphenylenediamin 1.2.4-triaminobenzene and 1.2-diamino-8-naphthol-4.6-disulfonic acid; and dyeing cotton blue shades which on being developed with diazotized para-nitranilin are changed to black shades fast to washing, substantially as described.

In testimony whereof I have hereunto set my hand in the presence of two subscribing witnesses.

MYRTIL KAHN. [L. S.]

Witnesses:
 OTTO KÖNIG,
 WILLY KLEIN.